United States Patent
Morgan

(10) Patent No.: US 12,032,999 B2
(45) Date of Patent: *Jul. 9, 2024

(54) SYSTEM FOR INTELLIGENT ALLOCATION OF A RESOURCE INTO AN AUXILIARY TANGIBLE SOURCE RETAINER

(71) Applicant: BANK OF AMERICA CORPORATION, Charlotte, NC (US)

(72) Inventor: Rebecca Stepp Morgan, Charlottesville, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 989 days.

This patent is subject to a terminal disclaimer.

(21) Appl. No.: 16/999,427

(22) Filed: Aug. 21, 2020

(65) Prior Publication Data

US 2022/0058059 A1 Feb. 24, 2022

(51) Int. Cl.
*G06F 9/50* (2006.01)
*G06N 5/04* (2023.01)
(Continued)

(52) U.S. Cl.
CPC ............. *G06F 9/5027* (2013.01); *G06N 5/04* (2013.01); *G06N 20/00* (2019.01); *G06Q 40/02* (2013.01)

(58) Field of Classification Search
CPC ...................................................... G06Q 40/02
See application file for complete search history.

(56) References Cited

U.S. PATENT DOCUMENTS

| 7,707,106 B1 | 4/2010 | Swanson, Sr. et al. |
| 11,095,650 B1 | 8/2021 | Jain et al. |

(Continued)

FOREIGN PATENT DOCUMENTS

| WO | WO-2008033097 A1 * | 3/2008 | ........... G06Q 20/105 |
| WO | 2011100372 A1 | 8/2011 | |

OTHER PUBLICATIONS

A. Rajwani, T. Syed, B. Khan and S. Behlim, "Regression Analysis for ATM Cash Flow Prediction," 2017 International Conference on Frontiers of Information Technology (FIT), Islamabad, Pakistan, 2017, https://ieeexplore.ieee.org/document/8261039?source=IQplus (Year: 2017).*

(Continued)

*Primary Examiner* — Ilana L Spar
*Assistant Examiner* — Melinda Gieringer
(74) *Attorney, Agent, or Firm* — Moore & Van Allen PLLC; R. W. McCord Rayburn

(57) ABSTRACT

Systems, computer program products, and methods are described herein for intelligent allocation of a resource into an auxiliary tangible source retainer. The present invention may be configured to determine a difference between a transferred amount of resources provided to an entity by a user and a total amount of a resource distribution, where the difference includes a primary amount of resources corresponding to primary tangible resources and a secondary amount of resources corresponding to secondary tangible resources. The present invention may be further configured to determine, based on a machine-readable code on an auxiliary tangible resource provided by the user, an auxiliary tangible source retainer associated with the auxiliary tangible resource and allocate, from a source retainer associated with the entity, the secondary amount of resources to the auxiliary tangible source retainer associated with the auxiliary tangible resource.

20 Claims, 2 Drawing Sheets

(51) Int. Cl.
  *G06N 20/00* (2019.01)
  *G06Q 40/02* (2023.01)

(56) References Cited

U.S. PATENT DOCUMENTS

| | | | |
|---|---|---|---|
| 11,327,947 | B1 | 5/2022 | Brubaker et al. |
| 11,348,041 | B2 | 5/2022 | Sellers et al. |
| 11,423,372 | B1* | 8/2022 | Martinson ............... G07G 1/12 |
| 11,526,822 | B2 | 12/2022 | Kochar et al. |
| 11,528,248 | B2 | 12/2022 | Rajeev et al. |
| 2007/0080213 | A1* | 4/2007 | Workman ............. G06Q 20/29 |
| | | | 705/16 |
| 2009/0206155 | A1 | 8/2009 | Chen |
| 2012/0047008 | A1* | 2/2012 | Alhadeff ........... G06Q 30/0215 |
| | | | 705/14.16 |
| 2012/0116956 | A1 | 5/2012 | Altman et al. |
| 2013/0091055 | A1* | 4/2013 | Doran .................. G06Q 20/28 |
| | | | 705/41 |
| 2013/0273843 | A1 | 10/2013 | Shimota et al. |
| 2015/0081411 | A1 | 3/2015 | Tucker et al. |
| 2016/0328692 | A1* | 11/2016 | Camps ............... G06Q 20/3223 |
| 2017/0132606 | A1 | 5/2017 | Jarman |
| 2017/0193501 | A1* | 7/2017 | Cole .................... G06Q 20/326 |
| 2018/0101839 | A1* | 4/2018 | Hamelton ............. G07F 19/203 |
| 2019/0147707 | A1* | 5/2019 | Phillips ................. G07F 19/206 |
| | | | 235/379 |
| 2021/0089944 | A1* | 3/2021 | Zhou ..................... G06Q 10/04 |
| 2021/0287209 | A1 | 9/2021 | Nelluri |
| 2022/0020046 | A1 | 1/2022 | Burrell et al. |
| 2022/0058058 | A1 | 2/2022 | Morgan |
| 2022/0060428 | A1 | 2/2022 | Morgan |
| 2022/0276919 | A1 | 9/2022 | Kavali et al. |

OTHER PUBLICATIONS

Chris Elsden, Tom Feltwell, Shaun Lawson, and John Vines. 2019. Recipes for Programmable Money. In Proceedings of the 2019 CHI Conference on Human Factors in Computing Systems (CHI '19). Association for Computing Machinery, New York, NY, USA, Paper 251, 1-13. (Year: 2019).

* cited by examiner

SYSTEM FOR INTELLIGENT ALLOCATION OF A RESOURCE INTO AN AUXILIARY TANGIBLE SOURCE RETAINER

FIELD OF THE INVENTION

The present invention embraces a system for intelligent allocation of a resource into an auxiliary tangible source retainer.

BACKGROUND

An entity and a user may initiate a resource distribution for an amount of resources. The user may provide more tangible resources to the entity than the amount of resources required for the resource distribution. The entity may provide, to the user, a difference between the amount of resources required for the resource distribution and the amount of tangible resources provided by the user by providing tangible resources including primary tangible resources and secondary tangible resources.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for intelligent allocation of a resource into an auxiliary tangible source retainer is presented. The system may include at least one non-transitory storage device and at least one processing device coupled to the at least one non-transitory storage device, where the at least one processing device is configured to determine a total amount of resources for a resource distribution between an entity and a user, receive input indicating that the user provided a transferred amount of tangible resources to the entity, determine a difference between the transferred amount and the total amount, where the difference includes a primary amount of resources corresponding to primary tangible resources and a secondary amount of resources corresponding to secondary tangible resources, determine, based on a machine-readable code on an auxiliary tangible resource provided by the user, an auxiliary tangible source retainer associated with the auxiliary tangible resource, and allocate, from a source retainer associated with the entity, the secondary amount of resources to the auxiliary tangible source retainer associated with the auxiliary tangible resource.

In some embodiments, the at least one processing device is configured to, before determining the total amount of resources, receive input to initiate the resource distribution.

In some embodiments, the at least one processing device is configured to decode machine-readable codes, where the input to initiate the resource distribution includes another machine-readable code being scanned.

In some embodiments, the at least one processing device is configured to, when receiving the input indicating that the user provided the transferred amount of tangible resources to the entity, receive the tangible resources and scan the tangible resources to determine the transferred amount.

In some embodiments, the at least one processing device is configured to, when receiving the input indicating that the user provided the transferred amount of tangible resources to the entity, receive, via an input device, input from another user associated with the entity.

In some embodiments, the at least one processing device is configured to determine whether a balance amount of resources of the auxiliary tangible source retainer satisfies a threshold, cause, based on the balance amount of resources of the auxiliary tangible source retainer satisfying the threshold, a third amount of primary tangible resources to be output to the user, and cause, based on causing the third amount of primary tangible resources to be output to the user, the balance amount to be reduced by the third amount.

In some embodiments, the at least one processing device is configured to allocate, based on the balance amount of resources of the auxiliary tangible source retainer satisfying the threshold, a fourth amount of resources from another source retainer to a source retainer associated with the user.

In some embodiments, the other source retainer is associated with another entity that provides tangible resources to the entity.

In some embodiments, the at least one processing device is configured to cause the primary amount of primary tangible resources to be output to the user.

In some embodiments, the at least one processing device is configured to decode machine-readable codes and, when determining the auxiliary tangible source retainer associated with the auxiliary tangible resource, decode the machine-readable code on the auxiliary tangible resource provided by the user.

In some embodiments, the at least one processing device is configured to, before allocating the secondary amount of resources to the auxiliary tangible source retainer associated with the auxiliary tangible resource, receive authorization to allocate the secondary amount of resources to the auxiliary tangible source retainer.

In some embodiments, the at least one processing device is configured to, before allocating the secondary amount of resources to the auxiliary tangible source retainer associated with the auxiliary tangible resource, receive authorization to allocate amounts of resources corresponding to secondary tangible resources to the auxiliary tangible source retainer for future resource distributions.

In another aspect, a computer program product for intelligent allocation of a resource into an auxiliary tangible source retainer is presented. The computer program product may include a non-transitory computer-readable medium including code causing a first apparatus to determine a total amount of resources for a resource distribution between an entity and a user, receive input indicating that the user provided a transferred amount of tangible resources to the entity, determine a difference between the transferred amount and the total amount, where the difference includes a primary amount of resources corresponding to primary tangible resources and a secondary amount of resources corresponding to secondary tangible resources, determine, based on a machine-readable code on an auxiliary tangible resource provided by the user, an auxiliary tangible source retainer associated with the auxiliary tangible resource, and allocate, from a source retainer associated with the entity, the secondary amount of resources to the auxiliary tangible source retainer associated with the auxiliary tangible resource.

In some embodiments, the non-transitory computer-readable medium may include code causing the first apparatus to, before determining the total amount of resources, receive input to initiate the resource distribution.

In some embodiments, the non-transitory computer-readable medium may include code causing the first apparatus to decode machine-readable codes, where the input to initiate the resource distribution includes another machine-readable code being scanned.

In some embodiments, the non-transitory computer-readable medium may include code causing the first apparatus to, when receiving the input indicating that the user provided the transferred amount of tangible resources to the entity, receive the tangible resources and scan the tangible resources to determine the transferred amount.

In some embodiments, the non-transitory computer-readable medium may include code causing the first apparatus to, when receiving the input indicating that the user provided the transferred amount of tangible resources to the entity, receive, via an input device, input from another user associated with the entity.

In some embodiments, the non-transitory computer-readable medium may include code causing the first apparatus to determine whether a balance amount of resources of the auxiliary tangible source retainer satisfies a threshold, cause, based on the balance amount of resources of the auxiliary tangible source retainer satisfying the threshold, a third amount of primary tangible resources to be output to the user, and cause, based on causing the third amount of primary tangible resources to be output to the user, the balance amount to be reduced by the third amount.

In some embodiments, the non-transitory computer-readable medium may include code causing the first apparatus to allocate, based on the balance amount of resources of the auxiliary tangible source retainer satisfying the threshold, a fourth amount of resources from another source retainer to a source retainer associated with the user.

In yet another aspect, a method for intelligent allocation of a resource into an auxiliary tangible source retainer is presented. The method may include determining a total amount of resources for a resource distribution between an entity and a user, receiving input indicating that the user provided a transferred amount of tangible resources to the entity, determining a difference between the transferred amount and the total amount, where the difference includes a primary amount of resources corresponding to primary tangible resources and a secondary amount of resources corresponding to secondary tangible resources, determining, based on a machine-readable code on an auxiliary tangible resource provided by the user, an auxiliary tangible source retainer associated with the auxiliary tangible resource, and allocating, from a source retainer associated with the entity, the secondary amount of resources to the auxiliary tangible source retainer associated with the auxiliary tangible resource.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
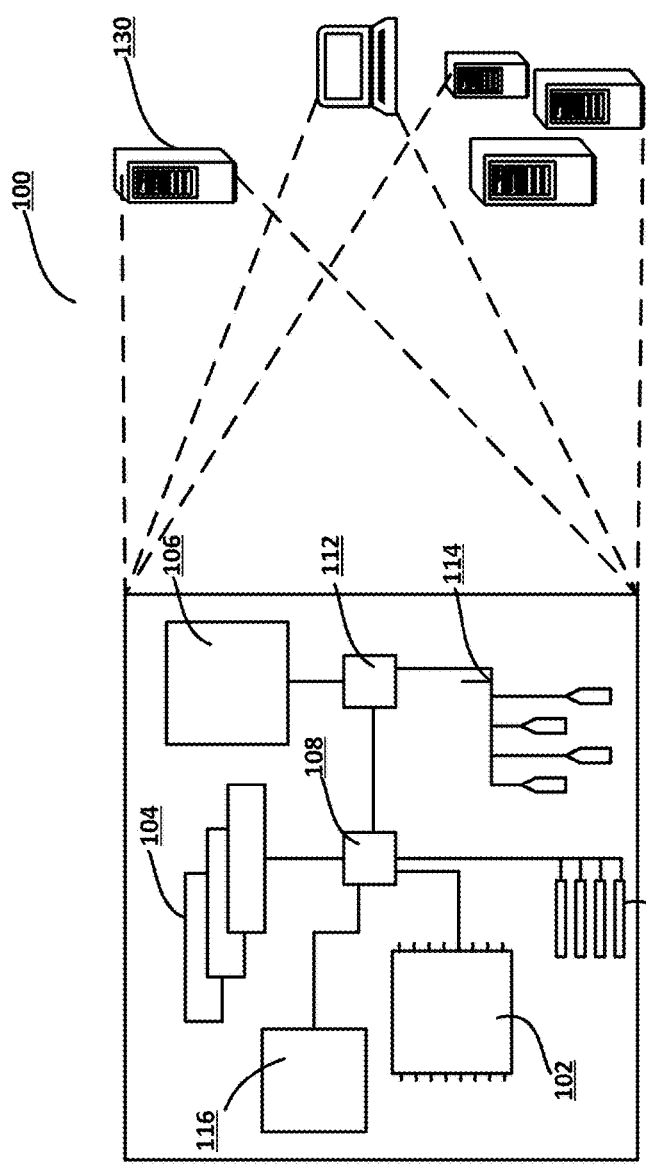
Figure 1:
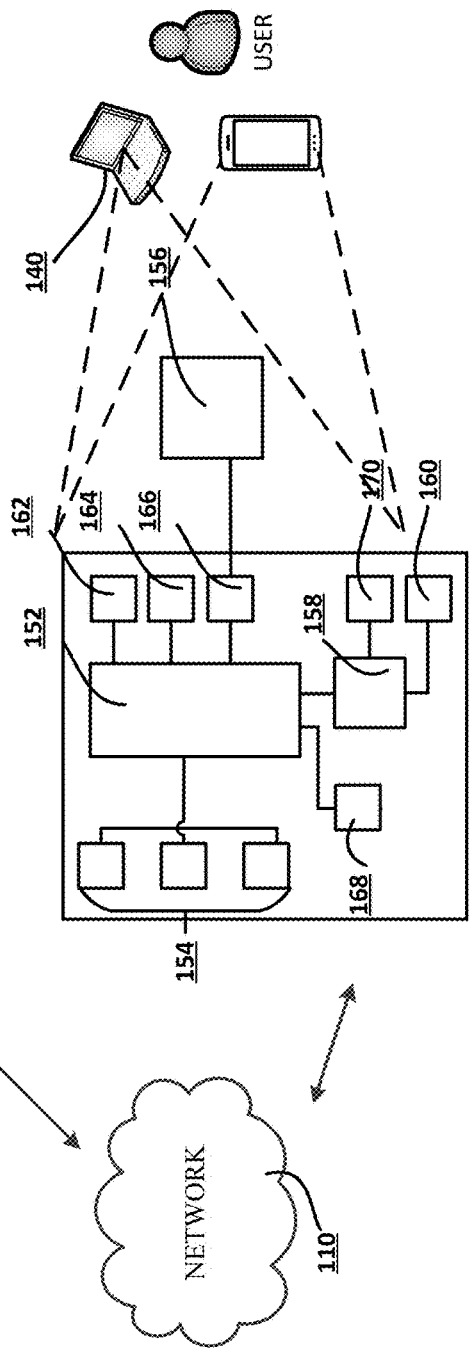
Figure 2:
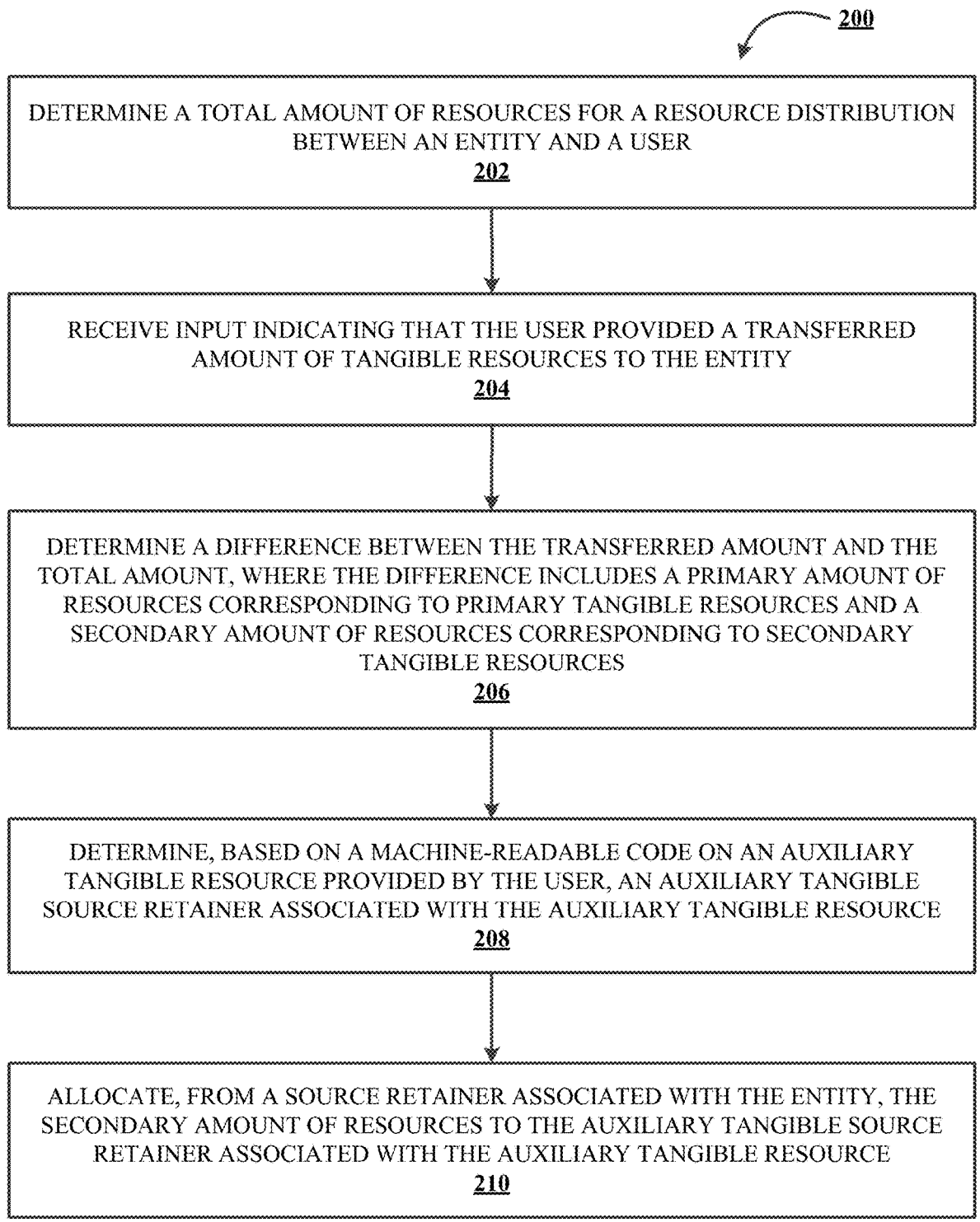

Having thus described embodiments of the invention in general terms, reference will now be made the accompanying drawings, wherein:

FIG. 1 illustrates technical components of a system for intelligent allocation of a resource into an auxiliary tangible source retainer, in accordance with an embodiment of the invention; and FIG. 2 illustrates a process flow for intelligent allocation of a resource into an auxiliary tangible source retainer, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include a graphical user interface (GUI) and/or an interface to input computer-executable instructions that direct a processing device to carry out functions. The user interface may employ input and/or output devices to input data received from a user and/or output data to a user. Input devices and/or output devices may include a display, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. As used herein, a "tangible resource" may generally refer to physical resources, such as objects, products, devices, goods, physical currency, physical cash, physical cash equivalents, and/or the like. As used herein, a "primary tangible resource" may generally refer to tangible resources having a user-preferred form factor and/or entity-preferred form factor, such as paper currency and/or the like. As used herein, a "secondary tangible resource" may generally refer to tangible resources having another form factor, such as coin currency and/or the like. As used herein, an "auxiliary tangible resource" may generally refer to tangible resources associated with auxiliary tangible source retainers, such as objects, products, devices, goods, and/or the like bearing information (e.g., a machine-readable code, such as a quick response (QR) code, a three-dimensional code, a datamatrix code, a barcode, and/or the like) identifying an auxiliary tangible source retainer associated therewith. In some embodiments, an auxiliary tangible resource may have a user-preferred form factor and/or entity-preferred form factor (e.g., a form factor equivalent to paper currency, a resource distribution instrument, and/or the like). Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like. As used herein, an "auxiliary source retainer" generally refers to an account, a system, and/or the like associated with a user and/or a type of resources, which may be managed and/or maintained by an entity for user-to-user resource distributions (e.g., person-to-person (P2P) transfers and/or the like). As used herein, an "auxiliary tangible source retainer" generally refers to an account, a system, and/or the like associated with an auxiliary tangible resource and/or resources corresponding to secondary tangible resources. Some example implementations include one or more source retainers, auxiliary source retainers, and/or auxiliary tangible source retainers associated with a user. In some example implementations, an auxiliary source retainer and/or an auxiliary tangible source retainer associated with a user may be associated with a source retainer associated with the user. Additionally, or alternatively, a source retainer may be associated with an entity (e.g., a merchant, a service provider, and/or the like) and may be managed and/or maintained by another entity (e.g., a financial institution and/or the like). Furthermore, an auxiliary source retainer may be associated with the entity for conducting resource distributions with users (e.g., customers and/or the like).

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a payment instrument (credit cards, debit cards, checks, digital wallets, currency, loyalty points) and/or payment credentials (account numbers, payment instrument identifiers). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction", a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that comprises both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, "authentication credentials" may be any information that may be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like.

FIG. 1 presents an exemplary block diagram of a system environment 100 for intelligent allocation of a resource into an auxiliary tangible source retainer within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to execute resource distributions and/or allocations of resources using one or more applications stored thereon. The one or more applications may be configured to communicate with the system 130, execute a resource distribution and/or an allocations of resources, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for intelligent allocation of a resource into an auxiliary tangible source retainer, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, and/or the like. The system 130 may be located at a facility associated with the entity and/or remotely from the facility associated with the entity.

The memory 104 may store information within the system 130. In one implementation, the memory 104 may be a volatile memory unit or units, such as volatile random access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application, and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry, and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140, and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, GPS (Global Positioning System) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user can provide input to the computer, and/or a pointing device (e.g., a mouse or a trackball) by which the user can provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment 100 may include a user input system and/or a point-of-sale system (e.g., similar to the system 130 and/or the user input system 140) associated with an entity (e.g., a merchant, a service provider, an establishment, a group, an institution, and/or the like), a resource management system (e.g., similar to the system 130) associated with another entity (e.g., a financial institution and/or the like), another user input system (e.g., similar to the user input system 140) associated with a user (e.g., a customer, a prospective customer, and/or the like). For example, a user (e.g., a customer) and an entity (e.g., a merchant) may conduct a resource distribution using a user input system and/or a point-of-sale system associated with the entity, another user input system associated with the user, an auxiliary tangible resource provided by the user, tangible resources, a resource distribution instrument, and/or the like. The user input system and/or the point-of-sale system associated with the entity may communicate with the resource management system to complete the resource distribution. In some embodiments, the user input system and/or the point-of-sale system associated with the entity, the resource management system, and/or the other user input system associated with the user may perform one or more of the steps described herein with respect to the process flow described herein with respect to FIG. 2.

As noted above, an entity and a user may initiate a resource distribution for an amount of resources. The user may provide more tangible resources to the entity than the amount of resources required for the resource distribution. The entity may provide, to the user, a difference between the amount of resources required for the resource distribution and the amount of tangible resources provided by the user by providing tangible resources including primary tangible resources and secondary tangible resources. However, the user may prefer not to have the secondary tangible resources (e.g., because the secondary tangible resources are more difficult to manage, store, transport, and/or the like than the primary tangible resources). Furthermore, the entity may prefer to keep the secondary tangible resources so that the secondary tangible resources are available to provide to other users when they provide more tangible resources than amounts required for resource distributions. Additionally, if the entity does not have enough secondary tangible resources, the entity may be required to request a distribution of additional secondary tangible resources from another entity, which consumes additional resources of the entity (e.g., computing resources, such as processing resources, memory resources, power resources, communication resources, and/or the like, network resources, financial resources, and/or the like). Finally, receiving, processing, and monitoring requests for secondary tangible resources and actually distributing the secondary tangible resources to entities consumes significant resources (e.g., computing resources, such as processing resources, memory resources, power resources, communication resources, and/or the like, network resources, physical resources, such as fuel, vehicle mileage, and/or the like, financial resources, and/or the like).

Some embodiments described herein provide a system, a computer program product, and/or a method for intelligent allocation of a resource into an auxiliary tangible source retainer. For example, a system may be configured to determine a total amount of resources for a resource distribution between an entity and a user. The system may be further configured to receive input indicating that the user provided a transferred amount of tangible resources to the entity. In some embodiments, the system may be further configured to determine a difference between the transferred amount and the total amount, where the difference includes a primary amount of resources corresponding to primary tangible resources and a secondary amount of resources corresponding to secondary tangible resources. In such embodiments, the system may be further configured determine, based on a machine-readable code on an auxiliary tangible resource provided by the user, an auxiliary tangible source retainer associated with the auxiliary tangible resource. In some embodiments, the system may be further configured to allocate, from a source retainer associated with the entity, the secondary amount of resources to the auxiliary tangible source retainer associated with the auxiliary tangible resource. By allocating the secondary amount of resources to the auxiliary tangible source retainer associated with the auxiliary tangible resource, the system prevents the user from receiving unwanted secondary tangible resources, keeps the secondary tangible resources available to provide to other users when they provide more tangible resources than amounts required for resource distributions, prevents or at least delays the entity requesting a distribution of additional secondary tangible resources from another entity, prevents or at least reduces the number of requests for secondary tangible resources received, processed, and monitored, and prevents or at least reduces the amount of secondary tangible resources distributed. In this way, the system may conserve computing resources (e.g., processing resources, memory resources, power resources, communication resources, and/or the like), network resources, physical resources, financial resources, and/or the like that would otherwise be consumed by providing the secondary tangible resources to the user.

FIG. 2 illustrates a process flow 200 for intelligent allocation of a resource into an auxiliary tangible source retainer within a technical environment, in accordance with an embodiment of the invention. As shown in block 202, the process flow may include determining a total amount of resources for a resource distribution between an entity and a user. For example, a system (e.g., similar to one or more of the systems described herein with respect to FIG. 1) may determine a total amount of resources for a resource distribution between an entity and a user. In some embodiments, the system may be associated with an entity (e.g., a merchant, a service provider, an establishment, a group, an institution, and/or the like). For example, a point-of-sale system may determine the total amount of resources for the resource distribution between the entity and the user (e.g., by calculating the total amount of resources based on one or more subtotal amounts of resources).

Additionally, or alternatively, the process flow may include, before determining the total amount of resources, receiving input to initiate the resource distribution. For example, the system associated with the entity (e.g., a point-of-sale system) may be configured to and/or may include a scanning and/or imaging device configured to decode machine-readable codes, and the input may include a machine-readable code being scanned. In such an example, the system may determine the total amount of resources for the resource distribution by scanning and/or decoding one or more machine-readable codes, determining, for each machine-readable code, a subtotal amount of resources associated with the machine-readable code, and determining, based on the subtotal amounts of resources associated with each machine-readable code, the total amount of resources for the resource distribution. Additionally, or alternatively, the system may receive input from a user via a user input device to initiate the resource distribution.

As shown in block 204, the process flow may include receiving input indicating that the user provided a transferred amount of tangible resources to the entity. For example, a system (e.g., similar to one or more of the systems described herein with respect to FIG. 1) may receive input indicating that the user provided a transferred amount of tangible resources to the entity. In some embodiments, the input may include input from another user (e.g., a user associated with the entity) via a user input device indicating the transferred amount of tangible resources provided by the user. Additionally, or alternatively, the system associated with the entity (e.g., a point-of-sale system) may be configured to and/or may include a scanning and/or imaging device configured to receive the tangible resources and scan the tangible resources to determine the transferred amount.

As shown in block 206, the process flow may include determining a difference between the transferred amount and the total amount, where the difference includes a primary amount of resources corresponding to primary tangible resources and a secondary amount of resources corresponding to secondary tangible resources. For example, a system (e.g., similar to one or more of the systems described herein with respect to FIG. 1) may determine the difference between the transferred amount and the total amount. In some embodiments, the difference may include a primary amount of resources corresponding to primary tangible resources, such that, if the system and/or another user associated with the entity provided the primary amount of resources to the user, the system and/or the other user may provide the primary amount of resources using primary tangible resources (e.g., tangible resources having a user-preferred form factor and/or entity-preferred form factor, such as paper currency and/or the like). Additionally, or alternatively, the difference may include a secondary amount of resources corresponding to secondary tangible resources, such that, if the system and/or another user associated with the entity provided the secondary amount of resources to the user, the system and/or the other user may provide the secondary amount of resources using secondary tangible resources (e.g., tangible resources having another form factor, such as coin currency and/or the like). For example, the secondary amount of resources may not be formed from primary tangible resources, such that the secondary amount of resources may only be provided using secondary tangible resources.

In some embodiments, the process flow may include causing the primary amount to be displayed. For example, a system (e.g., similar to one or more of the systems described herein with respect to FIG. 1) may cause the primary amount to be displayed. Additionally, or alternatively, a point-of-sale system and/or a user input system may include an output device, such as a display, a touch screen, LEDs, and/or the like, for displaying the primary amount to the user and/or to another user associated with the entity.

In some embodiments, the process flow may include causing the primary amount of primary tangible resources to be output to the user. For example, a system (e.g., similar to one or more of the systems described herein with respect to FIG. 1) may cause the primary amount of primary tangible resources to be output to the user. Additionally, or alternatively, a point-of-sale system and/or a user input system may include a tangible-resource-dispensing system for outputting primary tangible resources to the user and/or to another user associated with the entity (e.g., for the other user to provide the primary tangible resources to the user).

As shown in block 208, the process flow may include determining, based on a machine-readable code on an auxiliary tangible resource provided by the user, an auxiliary tangible source retainer associated with the auxiliary tangible resource. For example, a system (e.g., similar to one or more of the systems described herein with respect to FIG. 1) may determine, based on a machine-readable code on an auxiliary tangible resource provided by the user, an auxiliary tangible source retainer associated with the auxiliary tangible resource. In some embodiments, a system associated with the entity (e.g., a point-of-sale system) may be configured to and/or may include a scanning and/or imaging device configured to decode machine-readable codes and may, when determining the auxiliary tangible source retainer associated with the auxiliary tangible resource, decode the machine-readable code on the auxiliary tangible resource provided by the user. For example, the user may provide an auxiliary tangible resource bearing a machine-readable code, and the system and/or a device associated with the system may scan and/or image the machine readable code. The system and/or the device associated with the system may decode the machine readable code to obtain information identifying the auxiliary tangible source retainer associated with the auxiliary tangible resource. The system may provide, to another system for maintaining a plurality of auxiliary tangible source retainers, the information identifying the auxiliary tangible source retainer and may receive, from the other system, information associated with the auxiliary tangible source retainer (e.g., a balance amount of the auxiliary tangible source retainer, a user and/or an entity associated with the auxiliary tangible source retainer, and/or the like). Additionally, or alternatively, the process flow may include receiving information identifying the auxiliary tangible source retainer from another system and/or device that has decoded the machine-readable code on the auxiliary tangible resource provided by the user.

As shown in block 210, the process flow may include allocating, from a source retainer associated with the entity, the secondary amount of resources to the auxiliary tangible source retainer associated with the auxiliary tangible resource. For example, a system (e.g., similar to one or more of the systems described herein with respect to FIG. 1) may allocate, from the source retainer associated with the entity, the secondary amount of resources to the auxiliary tangible source retainer associated with the auxiliary tangible resource. In some embodiments, the system may allocate the secondary amount of resources from the source retainer associated with the entity to the auxiliary tangible source retainer associated with the auxiliary tangible resource by causing one or more other systems (e.g., a resource management system associated with another entity, such as a financial institution and/or the like) to allocate the secondary amount of resources from the source retainer associated with the entity to the auxiliary tangible source retainer associated with the auxiliary tangible resource.

In some embodiments, the process flow may include determining whether a balance amount of resources of the auxiliary tangible source retainer satisfies a threshold, causing, based on the balance amount of resources of the auxiliary tangible source retainer satisfying the threshold, a third amount of primary tangible resources to be output to the user, and causing, based on causing the third amount of primary tangible resources to be output to the user, the balance amount to be reduced by the third amount. For example, a system (e.g., similar to one or more of the systems described herein with respect to FIG. 1) may determine whether a balance amount of resources of the auxiliary tangible source retainer satisfies a threshold (e.g., exceeds a predetermined amount of resources and/or the like) and cause, based on the balance amount of resources of the auxiliary tangible source retainer satisfying the threshold, a third amount of primary tangible resources to be output to the user (e.g., by dispensing the third amount of primary tangible resources to the user, by providing a prompt instructing another user associated with the entity to provide the third amount of primary tangible resources to the user, and/or the like). In such an example, the system may cause, based on causing the third amount of primary tangible resources to be output to the user, the balance amount to be reduced by the third amount (e.g., by causing one or more other systems to reduce the balance amount, by reducing the balance amount, by registering a debit in a ledger system associated with the auxiliary tangible source retainer, and/or the like). In this way, the process may prevent the balance amount of the auxiliary tangible source retainer from becoming too great, such that misplacing, losing, and/or the like the auxiliary tangible resource associated with the auxiliary tangible source retainer would not be a significant loss of resources.

In some embodiments, the process flow may include allocating, based on the balance amount of resources of the auxiliary tangible source retainer satisfying a threshold, a fourth amount of resources from another source retainer to a source retainer associated with the user. For example, a system (e.g., similar to one or more of the systems described herein with respect to FIG. 1) may allocate, based on the balance amount of resources of the auxiliary tangible source retainer satisfying the threshold (e.g., exceeding a predetermined amount of resources and/or the like), a fourth amount of resources from another source retainer to a source retainer (e.g., a checking account, a deposit account, a savings account, a credit account, a rewards account, a rewards points account, a benefit rewards account, a bonus miles account, a cash back account, and/or the like) associated with the user. In such an example, the other source retainer may be associated with another entity (e.g., a financial institution and/or the like) that provides tangible resources to the entity.

In some embodiments, the other entity may provide tangible resources to a plurality of entities (e.g., a plurality of merchants, service provides, associations, institutions, and/or the like), the user may have a source retainer managed and/or maintained by the other entity, and the other entity may provide the auxiliary tangible resource to the user. In such embodiments, the other entity may encourage the user to receive amounts for secondary tangible resources using the auxiliary tangible resource and associated auxiliary tangible source retainer by allocating a fourth amount of resources to the user's source retainer when the balance amount of the auxiliary tangible source retainer satisfies a threshold. By encouraging the user to receive the secondary amount of resources with the auxiliary tangible resource and associated auxiliary tangible source retainer rather than as secondary tangible resources, the system may conserve computing resources (e.g., processing resources, memory resources, power resources, communication resources, and/or the like), network resources, physical resources (e.g., fuel, vehicle mileage, and/or the like), financial resources, and/or the like that would otherwise be consumed by the entity and/or the other entity when the user receives the secondary amount of resources as secondary tangible resources and the entity requests a distribution of additional secondary tangible resources and/or the other entity receives, processes, and monitors requests for secondary tangible resources and actually distributes the secondary tangible resources. Additionally, or alternatively, the other source retainer may be associated with the entity, and the entity may authorize the allocation of the fourth amount of resources based on the balance amount of resources of the auxiliary tangible source retainer satisfying the threshold to encourage the user to receive the secondary amount of resources with the auxiliary tangible resource and associated auxiliary tangible source retainer rather than as secondary tangible resources.

In some embodiments, the fourth amount of resources may be a fraction, percentage, multiple, and/or the like of the total amount, the transferred amount, the primary amount, the secondary amount, the third amount, the threshold, and/or the like. Additionally, or alternatively, the fourth amount of resources may be a fixed amount. In some embodiments, the process flow may include prompting the user and/or another user associated with the entity to provide authorization to allocate the secondary amount of resources to the auxiliary tangible source retainer, and the prompt may include a notification that the fourth amount of resources will be allocated to the source retainer associated with the user if the user and/or the other user authorizes the allocation of the secondary amount of resources to the auxiliary tangible source retainer.

In some embodiments, the process flow may include, before allocating the secondary amount of resources to the auxiliary tangible source retainer associated with the auxiliary tangible resource, receiving authorization to allocate the secondary amount of resources to the auxiliary tangible source retainer. For example, the system may prompt the user and/or another user associated with the entity to provide authorization to allocate the secondary amount of resources to the auxiliary tangible source retainer, and the system may receive the authorization. In some embodiments, the prompt may include a first option to authorize allocation of the secondary amount of resources to the auxiliary tangible source retainer and a second option to receive the secondary amount of resources as secondary tangible resources.

In some embodiments, the process flow may include, before allocating the secondary amount of resources to the auxiliary tangible source retainer associated with the auxiliary tangible resource, receive authorization to allocate amounts of resources corresponding to secondary tangible resources to the auxiliary tangible source retainer for future resource distributions. For example, the system may prompt the user and/or another user associated with the entity to provide authorization to allocate amounts of resources corresponding to secondary tangible resources to the auxiliary tangible source retainer for future resource distributions, and the system may receive the authorization. In some embodiments, the prompt may include a first option to authorize allocation of the secondary amount of resources to the auxiliary tangible source retainer for one resource distribution, a second option to authorize allocation of amounts of resources corresponding to secondary tangible resources to the auxiliary tangible source retainer for future resource distributions, and a third option to receive the secondary amount of resources as secondary tangible resources. Additionally, or alternatively, the system may, based on receiving authorization to allocate amounts of resources corresponding to secondary tangible resources to the auxiliary tangible source retainer for future resource distributions, automatically allocate another secondary amount of resources corresponding to tangible resources for another resource distribution between the entity and the user to the auxiliary tangible source retainer.

In some embodiments, the process flow may include determining a likelihood that the entity will run out of secondary tangible resources using machine learning and/or a machine learning model. For example, the system may provide attributes (e.g., amounts, types, times, days of the week, dates, and/or the like) of resource distributions to a machine learning model trained (e.g., using historical data associated with previous resource distributions) to output a potential for exhaustion of secondary tangible resources.

In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, an LDA, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system can additionally or alternatively leverage a probabilistic module, heuristic module, deterministic module, or any other suitable module leveraging any other suitable computation method, machine learning method or combination thereof. However, any suitable machine learning approach can otherwise be incorporated in the system. Further, any suitable model (e.g., machine learning, non-machine learning, etc.) can be used in generating data relevant to the system. In some embodiments, the one or more machine learning algorithms may be predictive modeling algorithms configured to use data and statistics to predict outcomes with forecasting models.

In some embodiments, the machine learning model may be generated by training on data regarding resource distributions, users, entities, and/or the like over a predetermined past period of time. In doing so, the system may be configured to determine, for each resource distribution and/or for each day, a potential for exhaustion of secondary tangible resources associated with the resource distribution and/or the day. In some embodiments, the one or more machine learning algorithms may be used to calculate the likelihood of the entity running out of secondary tangible resources, and whether the likelihood satisfies a threshold.

In some embodiments, the process flow may include automatically requesting, based on the potential for exhaustion of secondary tangible resources satisfying a threshold, additional secondary tangible resources from another entity. Additionally, or alternatively, the process flow may include prompting, based on the potential for exhaustion of secondary tangible resources satisfying a threshold, the user and/or another user associated with the entity to provide authorization to allocate the secondary amount of resources to the auxiliary tangible source retainer.

Merchants and/or service providers and a customer may initiate a transaction for an amount. The customer may provide more cash (e.g., paper bills, coins, and/or the like) to the merchant and/or service provider than the amount of the transaction. The merchant and/or service provider may provide change to the customer in cash including paper bills and coins. However, customers may prefer to not have coins (e.g., because coins are more difficult to manage, store, transport, and/or the like than paper bills). Furthermore, merchants and/or service providers may prefer to keep the coins so that the coins are available to provide change to other customers. Additionally, if the merchant and/or service provider does not have enough change, the merchant and/or service provider may be required to request and/or obtain more coins from a financial institution. Financial institutions consume significant computing resources, network resources, physical resources, and financial resources receiving, processing, and monitoring requests for coins and actually distributing the coins to merchants and/or service providers.

Accordingly, methods and/or systems described herein may permit merchants and/or service providers to provide change into accounts identified by machine-readable codes on paper bills carried by customers (e.g., rather than providing coins to customers). In this way, merchants and/or service providers may conduct more transactions without using coins, which reduces the amount of coins that the merchants and/or service providers must have on hand and/or must order from a financial institution. Furthermore, customers may receive change into an account identified by a paper bill which may be stored with regular paper currency, rather than receiving unpreferable coins. Additionally, when a market experiences a shortage of coins in circulation, the ability to provide change to a customer's account may permit merchants and/or service providers to continue to conduct cash-based transactions, while using fewer coins.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for intelligent allocation of a resource into an auxiliary tangible source retainer, the system comprising:
   an imaging device configured to decode machine-readable codes;
   a scanning device;
   a tangible-resource-dispensing system;
   a communication interface for wireless communication;
   at least one non-transitory storage device comprising computer-executable program code; and
   at least one processing device coupled to the imaging device, the scanning device, the tangible-resource-dispensing system, the communication interface, and the at least one non-transitory storage device, wherein the at least one processing device is configured to execute the computer-executable program code to:

train, using a semi-supervised learning algorithm and historical data associated with previous transactions, a neural network model to output potentials for exhaustion of coin currency based on attributes of transactions, wherein the attributes comprise amounts, types, times, days of week, and dates of the transactions;

determine, using the neural network model, a potential for exhaustion of coin currency of an entity by providing attributes of transactions to the neural network model;

determine whether the potential for exhaustion of coin currency of the entity satisfies a threshold;

scan, with the imaging device, a machine-readable code;

initiate, in response to scanning the machine-readable code, a transaction between the entity and a user;

determine a total amount of resources for the transaction between the entity and the user;

receive, with the scanning device, physical cash from the user;

scan, with the scanning device, the physical cash to determine that the user provided a transferred amount of physical cash to the entity;

determine a difference between the transferred amount and the total amount, wherein the difference comprises a primary amount of resources corresponding to paper currency and a secondary amount of resources corresponding to coin currency;

prompt, in response to determining that the potential for exhaustion of coin currency of the entity satisfies the threshold and in response to determining that the difference comprises the secondary amount of resources corresponding to coin currency, the user to provide authorization to allocate the secondary amount of resources to an account for person-to-person transfers associated with the user;

receive, in response to prompting the user to provide authorization and via the communication interface, a wireless transmission comprising authorization and information identifying the account for person-to-person transfers associated with the user;

allocate, in response to receiving the wireless transmission and from a source retainer associated with the entity, the secondary amount of resources to the account for person-to-person transfers associated with the user;

output, in response to receiving the wireless transmission and with the tangible-resource-dispensing system, the primary amount of paper currency to the user; and automatically request, in response to determining that the potential for exhaustion of coin currency of the entity satisfies the threshold, in response to prompting the user to provide authorization, and in response to not receiving the authorization, additional coin currency from another entity.

2. The system of claim 1, wherein the at least one processing device is configured to execute the computer-executable program code to, before scanning the machine-readable code, receive input to initiate the transaction.

3. The system of claim 1, wherein the at least one processing device is configured to execute the computer-executable program code to:

determine whether a balance amount of resources of the account for person-to-person transfers associated with the user satisfies a threshold;

output, with the tangible-resource-dispensing system and based on the balance amount of resources of the account for person-to-person transfers associated with the user satisfying the threshold, a third amount of paper currency to be output to the user; and cause, based on outputting the third amount of paper currency to be output to the user, the balance amount to be reduced by the third amount.

4. The system of claim 3, wherein the at least one processing device is configured to execute the computer-executable program code to allocate, based on the balance amount of resources of the account for person-to-person transfers associated with the user satisfying the threshold, a fourth amount of resources from another source retainer to a source retainer associated with the user.

5. The system of claim 4, wherein the other source retainer is associated with another entity that provides physical cash to the entity.

6. The system of claim 1, wherein the at least one processing device is configured to execute the computer-executable program code to, before allocating the secondary amount of resources to the account for person-to-person transfers associated with the user, receive authorization to allocate amounts of resources corresponding to coin currency to the account for person-to-person transfers associated with the user for future resource distributions.

7. A computer program product for intelligent allocation of a resource into an auxiliary tangible source retainer, the computer program product comprising a non-transitory computer-readable medium comprising code causing a first apparatus to:

train, using a semi-supervised learning algorithm and historical data associated with previous transactions, a neural network model to output potentials for exhaustion of coin currency based on attributes of transactions, wherein the attributes comprise amounts, types, times, days of week, and dates of the transactions;

determine, using the neural network model, a potential for exhaustion of coin currency of an entity by providing attributes of transactions to the neural network model;

determine whether the potential for exhaustion of coin currency of the entity satisfies a threshold;

scan, with an imaging device configured to decode machine-readable codes, a machine-readable code;

initiate, in response to scanning the machine-readable code, a transaction between the entity and a user;

determine a total amount of resources for the transaction between the entity and the user;

receive, with a scanning device, physical cash from the user;

scan, with the scanning device, the physical cash to determine that the user provided a transferred amount of physical cash to the entity;

determine a difference between the transferred amount and the total amount, wherein the difference comprises a primary amount of resources corresponding to paper currency and a secondary amount of resources corresponding to coin currency;

prompt, in response to determining that the potential for exhaustion of coin currency of the entity satisfies the threshold and in response to determining that the difference comprises the secondary amount of resources corresponding to coin currency, the user to provide authorization to allocate the secondary amount of resources to an account for person-to-person transfers associated with the user;

receive, in response to prompting the user to provide authorization and via a communication interface of the first apparatus, a wireless transmission comprising authorization and information identifying the account for person-to-person transfers associated with the user;

allocate, in response to receiving the wireless transmission and from a source retainer associated with the entity, the secondary amount of resources to the account for person-to-person transfers associated with the user;

output, in response to receiving the wireless transmission and with a tangible-resource-dispensing system of the first apparatus, the primary amount of paper currency to the user; and automatically request, in response to determining that the potential for exhaustion of coin currency of the entity satisfies the threshold, in response to prompting the user to provide authorization, and in response to not receiving the authorization, additional coin currency from another entity.

8. The computer program product of claim 7, wherein the non-transitory computer-readable medium comprises code causing the first apparatus to, before scanning the machine-readable code, receive input to initiate the transaction.

9. The computer program product of claim 7, wherein the non-transitory computer-readable medium comprises code causing the first apparatus to:

determine whether a balance amount of resources of the account for person-to-person transfers associated with the user satisfies a threshold;

output, with the tangible-resource-dispensing system and based on the balance amount of resources of the account for person-to-person transfers associated with the user satisfying the threshold, a third amount of paper currency to be output to the user; and cause, based on outputting the third amount of paper currency to be output to the user, the balance amount to be reduced by the third amount.

10. The computer program product of claim 9, wherein the non-transitory computer-readable medium comprises code causing the first apparatus to allocate, based on the balance amount of resources of the account for person-to-person transfers associated with the user satisfying the threshold, a fourth amount of resources from another source retainer to a source retainer associated with the user.

11. A method for intelligent allocation of a resource into an auxiliary tangible source retainer, the method comprising:

training, using a semi-supervised learning algorithm and historical data associated with previous transactions, a neural network model to output potentials for exhaustion of coin currency based on attributes of transactions, wherein the attributes comprise amounts, types, times, days of week, and dates of the transactions;

determining, using the neural network model, a potential for exhaustion of coin currency of an entity by providing attributes of transactions to the neural network model;

determining whether the potential for exhaustion of coin currency of the entity satisfies a threshold;

scanning, with an imaging device configured to decode machine-readable codes, a machine-readable code;

initiating, in response to scanning the machine-readable code, a transaction between the entity and a user;

determining a total amount of resources for the transaction between the entity and the user;

receiving, with a scanning device, physical cash from the user;

scanning, with the scanning device, the physical cash to determine that the user provided a transferred amount of physical cash to the entity;

determining a difference between the transferred amount and the total amount, wherein the difference comprises a primary amount of resources corresponding to paper currency and a secondary amount of resources corresponding to coin currency;

prompting, in response to determining that the potential for exhaustion of coin currency of the entity satisfies the threshold and in response to determining that the difference comprises the secondary amount of resources corresponding to coin currency, the user to provide authorization to allocate the secondary amount of resources to an account for person-to-person transfers associated with the user;

receiving, in response to prompting the user to provide authorization and via a communication interface, a wireless transmission comprising authorization and information identifying the account for person-to-person transfers associated with the user;

allocating, in response to receiving the wireless transmission and from a source retainer associated with the entity, the secondary amount of resources to the account for person-to-person transfers associated with the user;

outputting, in response to receiving the wireless transmission and with a tangible-resource-dispensing system, the primary amount of paper currency to the user; and automatically requesting, in response to determining that the potential for exhaustion of coin currency of the entity satisfies the threshold, in response to prompting the user to provide authorization, and in response to not receiving the authorization, additional coin currency from another entity.

12. The method of claim 11, comprising, before scanning the machine-readable code, receiving input to initiate the transaction.

13. The method of claim 11, comprising:

determining whether a balance amount of resources of the account for person-to-person transfers associated with the user satisfies a threshold;

outputting, with the tangible-resource-dispensing system and based on the balance amount of resources of the account for person-to-person transfers associated with the user satisfying the threshold, a third amount of paper currency to be output to the user; and causing, based on outputting the third amount of paper currency to be output to the user, the balance amount to be reduced by the third amount.

14. The method of claim 13, wherein the other source retainer is associated with another entity that provides physical cash to the entity.

15. The method of claim 11, comprising, before allocating the secondary amount of resources to the account for person-to-person transfers associated with the user, receiving authorization to allocate amounts of resources corresponding to coin currency to the account for person-to-person transfers associated with the user for future resource distributions.

16. The method of claim 11, wherein receiving the wireless transmission comprising information identifying the account for person-to-person transfers comprises receiving the wireless transmission comprising information identifying the account for person-to-person transfers using a transceiver for short-range communication.

17. The method of claim 11, wherein receiving the wireless transmission comprising information identifying the account for person-to-person transfers comprises receiving the wireless transmission comprising information identifying the account for person-to-person transfers using a Bluetooth transceiver.

18. The computer program product of claim 9, wherein the other source retainer is associated with another entity that provides physical cash to the entity.

19. The computer program product of claim 7, wherein the non-transitory computer-readable medium comprises code causing the first apparatus to, before allocating the secondary amount of resources to the account for person-to-person transfers associated with the user, receiving authorization to allocate amounts of resources corresponding to coin currency to the account for person-to-person transfers associated with the user for future resource distributions.

20. The computer program product of claim 7, wherein receiving the wireless transmission comprising information identifying the account for person-to-person transfers comprises receiving the wireless transmission comprising information identifying the account for person-to-person transfers using a transceiver for short-range communication.

\* \* \* \* \*